United States Patent [19]

Arai et al.

[11] Patent Number: 4,818,451
[45] Date of Patent: Apr. 4, 1989

[54] METHOD OF PREPARING A FOAMED MOLDED ARTICLE AND BLOW-FILLING GUN APPARATUS FOR USE THEREIN

[75] Inventors: Masakazu Arai; Masahiro Tanaka, both of Mie, Japan

[73] Assignee: Mitsubishi Yuka Badische Co., Ltd., Yokkaichi, Japan

[21] Appl. No.: 33,351

[22] Filed: Apr. 2, 1987

[30] Foreign Application Priority Data

Apr. 2, 1986 [JP] Japan ................................. 61-74319
May 8, 1986 [JP] Japan ................................. 61-103878

[51] Int. Cl.⁴ ..................... C08J 9/22; B29B 13/00; B29C 13/06
[52] U.S. Cl. ..................... 264/40.3; 264/50; 264/51; 264/DIG. 10; 264/DIG. 15; 264/DIG. 18; 425/4 R; 425/145; 425/146
[58] Field of Search ............. 264/50, 51, 53, DIG. 10, 264/40.5, 40.1, 40.3, DIG. 15, DIG. 18; 425/146, 145, 4 R

[56] References Cited

U.S. PATENT DOCUMENTS 3,504,068 3/1970 Zizlsperger et al. ............ 264/53 X
3,953,558 4/1976 Hatano et al. .................... 264/50 X

FOREIGN PATENT DOCUMENTS 59-12455 3/1984 Japan.
1445474 8/1976 United Kingdom.

Primary Examiner—Philip Anderson
Attorney, Agent, or Firm—Oblon, Fisher, Spivak, McClelland & Maier

[57] ABSTRACT

A method of molding pre-foamed synthetic resin particles is described, which comprises increasing the pressure in a mold cavity with a pressurized gas, charging the mold cavity with pre-foamed synthetic resin particles as they are compressed with a gas pressurized to a pressure higher than the pressure in the mold cavity and heating the charged pre-foamed synthetic resin particles with steam so that they are fused together or expanded and fused together to form a foamed molded article, wherein a pressure detector is provided in a conduit for conveying the pre-foamed synthetic resin particles into the mold cavity as they are carried by the pressurized gas or at an inlet portion of a charging port leading to the mold cavity, and the supply of pre-foamed synthetic resin particles into the mold cavity is stopped when the pressure detected by the detector exceeds the pressure in the mold cavity by a predetermined amount. A blow-filing gun apparatus suitable for use in the practice of the molding method is also described.

13 Claims, 2 Drawing Sheets

METHOD OF PREPARING A FOAMED MOLDED ARTICLE AND BLOW-FILLING GUN APPARATUS FOR USE THEREIN

FIELD OF THE INVENTION

The present invention relates to an improved method of molding pre-foamed synthetic resin particles into a foamed molded article. The present invention also relates to a blow-filling gun apparatus suitable for use in the practice of the molding method.

The molding method and blow-filling gun apparatus of the present invention are useful in the manufacture of foamed molded articles of thermoplastic synthetic resins used as a variety of containers, heat insulating materials, cushioning materials, etc.

BACKGROUND OF THE INVENTION

Procedures employed commonly in charging pre-foamed synthetic resin particles into a mold cavity consist of firstly metering the necessary volume of pre-foamed synthetic resin particles to be charged, secondly charging the mold cavity with the metered portion of pre-foamed synthetic resin particles through a blow-filling gun, and closing a charging port leading to the mold cavity. The metering of pre-foamed synthetic resin particles to be charged can be achieved by several methods such as, for example, a one-step batch-wise metering of total volume to be charged by using a big metering vessel and a multi-step metering of each divided portion of total volume to be charged by using rather small chambers in the rotor as shown in FIG. 1 and FIG. 2 (see Japanese Patent Publication Nos. 41736/83 and 10296/84, Japanese Laid-Open Patent Application No. 63170/79, British Patent No. 1,445,474 and West German Patent No. 2,363,923).

However, these conventional methods of closing a charging port leading to the mold cavity after the mold cavity has been charged with the entire portion of a metered amount of pre-foamed synthetic resin particles are prone to cause overfilling or underfilling which leads to a high reject rate of foamed molded articles because pre-foamed synthetic resin particles generally have variations in bulk density (ca. 10 to 20% variation with pre-foamed synthetic resin particles).

In the prior art, molding of pre-foamed synthetic resin particles is accomplished with the initial setting of air pressure in the mold cavity being determined in accordance with the bulk density of pre-foamed synthetic resin particles. Therefore, pre-foamed synthetic resin particles having a higher bulk density than the average bulk density are less compressed because of their high compressure stress and they occupy an unduly large space in the mold cavity under compression, with the result that the charging port leading to the mold cavity is closed with the charging in the mold cavity being overfilled up to a cylinder of the blowfilling gun by exceeding the mold cavity. Because of the overfilling at the charging port of the blow-filling gun connected to the mold cavity, the flow of steam among the pre-foamed synthetic resin particles is impeded and the insufficiency of fusion of the pre-foamed synthetic resin particles is liable to yield a foamed molded article with a cleft or a space among the fused foamed synthetic resin particles. On the other hand, pre-foamed synthetic resin particles having a lower bulk density than the average bulk density occupy an unduly small space in the mold cavity under compression, with the result that the charging port leading to the mold cavity is closed with the charging in the mold cavity being shorter than the full capacity of the mold cavity. This has a tendency to cause underfilling at the charging port leading to the mold cavity.

SUMMARY OF THE INVENTION

An object of the present invention is to provide a method of molding pre-foamed synthetic resin particles into a foamed molded article that easily and automatically allows just the right volume of pre-foamed synthetic resin particles to be charged into a mold cavity even if there is any variation in the bulk density of pre-foamed synthetic resin particles and by which the reject rate of foamed molded articles that is dependent on overfilling or underfilling of the pre-foamed synthetic resin particles can be reduced.

Another object of the present invention is to provide a blow-filling gun apparatus that is suitable for use in implementing the molding method.

The present inventors conducted various studies in order to solve the aforementioned problems of the prior art and reached the idea of providing a pressure detector, in a conduit for conveying pre-foamed synthetic resin particles into a mold cavity or at an inlet portion of a charging port leading to the mold cavity, for the purpose of detecting the pressure in the conduit or at the inlet portion while the mold cavity is being charged with the pre-foamed synthetic resin particles. If the supply of pre-foamed synthetic resin particles into the mold cavity is stopped when the pressure detected by the detector exceeds the pressure in the mold cavity by a predetermined amount, the mold cavity can be charged with just the right amount of pre-foamed synthetic resin particles in an easy and automatic manner. The present invention has been accomplished on the basis of this discovery.

The molding method of the present invention basically comprises increasing the pressure in a mold cavity with a pressurized gas, charging the mold cavity with pre-foamed synthetic resin particles as they are compressed with a gas pressurized to a pressure higher than the pressure in the mold cavity and heating the charged pre-foamed synthetic resin particles with steam so that they are fused together or expanded and fused together to form a foamed molded article. In this method, a pressure detector is provided in a conduit for conveying the pre-foamed synthetic resin particles into the mold cavity as they are carried by the pressurized gas or at an inlet portion of a charging port leading to the mold cavity, and the supply of pre-foamed synthetic resin particles into the mold cavity is stopped when the pressure detected by the detector exceeds the pressure in the mold cavity by a predetermined amount.

DETAILED DESCRIPTION OF THE INVENTION

Figure 1:
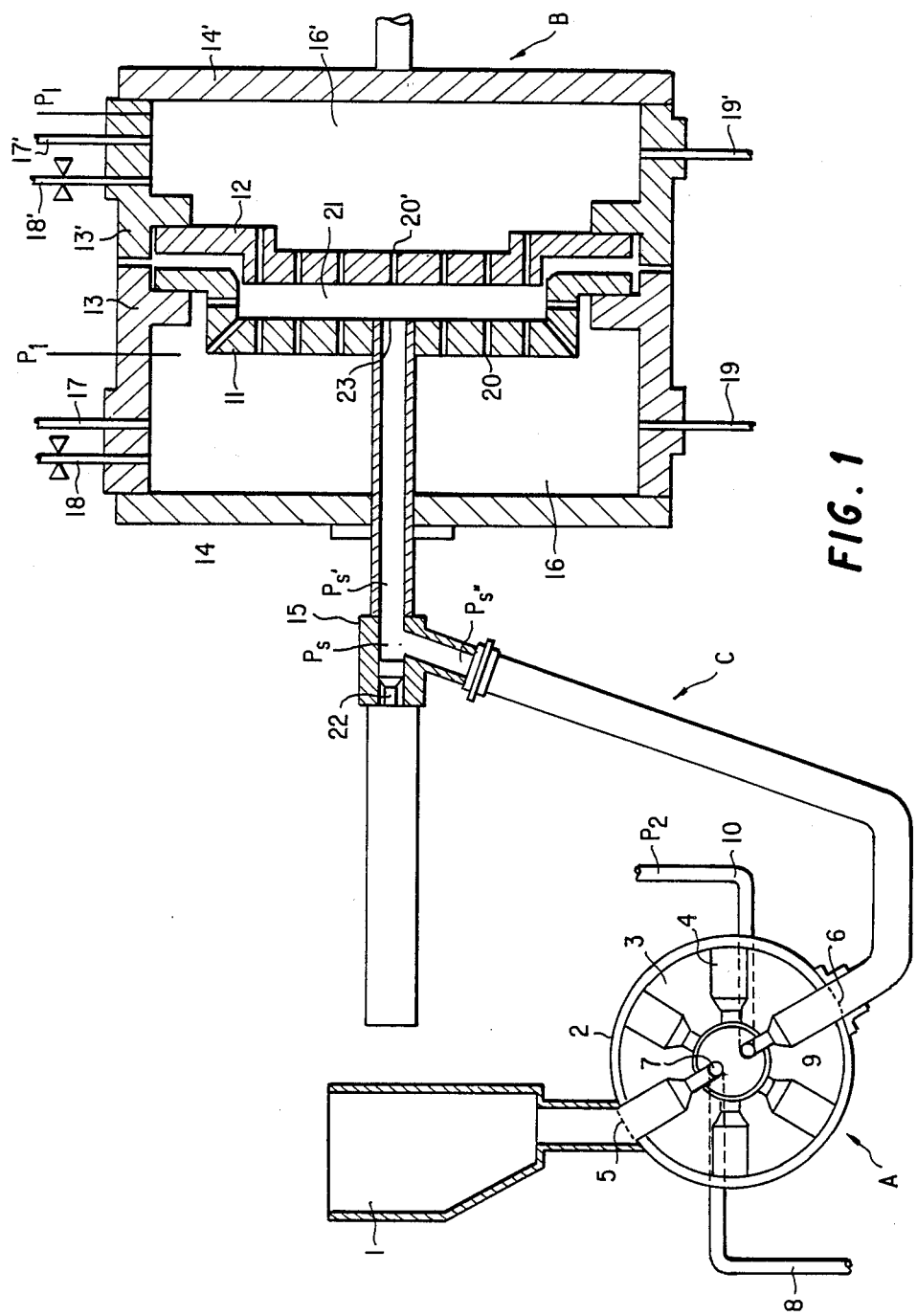
FIG. 1 shows a molding apparatus for molding pre-foamed synthetic resin particles wherein the conduit for conveying the particles to the mold cavity of the molding apparatus has a pressure switch.

A variety of devices may be employed as the pressure detector to be provided in a conduit for conveying pre-foamed synthetic resin particles into a mold cavity or at an inlet portion of a charging port leading to the mold cavity and as a device for stopping the supply of pre-foamed synthetic resin particles in response to the detected pressure. A pressure switch which operates in accordance with a preset threshold pressure is desirably used for this purpose. If a pressure switch is used, it is provided in a conduit for conveying pre-foamed synthetic resin particles into a mold cavity or at an inlet portion of a charging port leading to the mold cavity and, if the pressure in the conduit or at the inlet portion as detected by this pressure switch has reached a predetermined level, the pressure switch is actuated to stop the supply of pre-foamed synthetic resin particles into the mold cavity.

In accordance with the present invention, a pressure detector, for example, a pressure switch is located at any point in a conduit through which pre-foamed synthetic resin particles as carried by a pressurized gas are conveyed into the mold cavity or in an area that maintains the same pressure as in the conduit, or at the inlet portion of a charging port leading to the mold cavity. The pressure detector is desirably positioned in most proximity to the inlet portion of charging port leading to the mold cavity and it is particularly desirable that the detector is positioned at the inlet portion.

A particularly preferable embodiment of the present invention wherein a pressure detector is provided at the inlet portion of charging port leading to the mold cavity is a blow-filling gun apparatus that includes a main opening that communicates with the charging port leading to the mold cavity, a branch opening that communicates with a conduit for conveying pre-foamed synthetic resin particles, a sheathed blow-filling gun cylinder that connects the charging port leading to the mold cavity to the main opening, and a plunger that is capable of closing the charging port leading to the mold cavity, the gap between the inner and outer pipes of the sheathed blow-filling gun cylinder communicating with the inlet portion of the charging port leading to the mold cavity, and the pressure detector being mounted in the gap between the inner and outer pipes of the sheathed blow-filling gun cylinder.

It should, however, be noted that the applicability of the molding method of the present invention is not limited to this particular type of a blow-filling gun apparatus and that it may be implemented by using various other types of blow-filling gun apparatus for pre-foamed synthetic resin particles.

A blow-filling gun apparatus that includes a main opening that communicates with a charging port leading to a mold cavity, a branch opening that communicates with a conduit for conveying pre-foamed synthetic resin particles, a sheathed blow-filling gun cylinder that connects the charging port leading to the mold cavity to the main opening, and a plunger that is capable of closing the charging port leading to the mold cavity, with the gap between the inner and outer pipes of the sheathed blow-filling gun cylinder communicating with the inlet portion of the charging port leading to the mold cavity, is a known apparatus (see Japanese Utility Model Publication No. 8946/76). However, in this known blow-filling gun apparatus, the gap between the inner and outer pipes of the sheathed blow-filling gun cylinder is made to communicate with the inlet portion of charging port leading to the mold cavity in order that air blown from an air spout in the gap is squirted to the inlet portion of the charging port so as to blow back any excess pre-foamed synthetic resin particles remaining at the front end of the blow-filling gun cylinder after charging of the mold cavity has been completed. Therefore, no pressure detector is provided in the gap between the inner and outer pipes of the sheathed blow-filling gun cylinder and, in this respect, this known blow-filling gun apparatus differs entirely from the blow-filling gun apparatus that is particularly preferable for use in the present invention.

The threshold level of pressure at which the pressure switch used in the present invention is actuated is typically set 0.2 to 1 $kg/cm^2$ higher, preferably 0.4 to 0.7 $kg/cm^2$ higher, than the pressure within the mold cavity. If the setting of this threshold level is too close to the pressure in the mold cavity, erroneous operation of the pressure switch will easily occur. If, on the other hand, the setting of the threshold level is excessively higher than the pressure in the mold cavity, the timing of stopping the supply of pre-foamed synthetic resin particles will be delayed to increase the chance of the occurrence of over-filling.

According to the present invention, the supply of pre-foamed synthetic resin particles into a mold cavity is desirably stopped in the following manner: in response to pressure detected by the pressure detector described above, the plunger is moved in a direction that closes the charging port of the mold cavity and, at the same time, a motor for a rotary feeder of pre-foamed synthetic resin particles is caused to stop so as to stop the conveyance of the pre-foamed synthetic resin particles into the mold cavity.

The method of molding pre-foamed synthetic resin particles according to the present invention is applicable to the molding of pre-foamed particles of thermoplastic resins such as: polypropylene, polystyrene, polyethylene, ethylene/ vinyl acetate copolymer, metal salts of an ethylene/(meth)acrylic acid copolymer, α-methylstyrene/styrene/acrylonitrile copolymer, styrene grafted polyethylene copolymer, styrene grafted polypropylene copolymer, and crosslinked resins thereof. Pre-foamed particles prepared from mixtures of these resins, or from compositions in which these resins or mixtures thereof are blended with ethylene/propylene copolymer rubber or polyisobutylene rubber may also be molded by the method of the present invention. The pre-foamed synthetic resin particles to be molded by the present invention generally have bulk densities of 10 to 90 g/l and diameters of 2 to 10 mm. The pre-foamed synthetic resin particles may or may not be crosslinked.

The pre-foamed synthetic resin particles described above can be produced by various methods: in one method, a resin in admixture with a blowing agent is extruded through an extruder, after it emerges from the nozzle at the end of the extruder, the pressure in the extrudate is released to cause its expansion, and the expanded resin is cut into discrete pre-foamed synthetic resin particles; in another method, resin particles are charged into a pressure-resistance vessel together with a dispersion medium such as water, etc., a blowing agent, a dispersant and any other necessary additives, and the dispersion is heated under agitation at a temperature in the vicinity of the softening point of the resin particles so that the blowing agent is impregnated in the resin particles and, thereafter, one end of the vessel is opened to release the resin particles and dispersion medium into an atmosphere whose pressure is lower than that in the vessel; in still another method, the particles of expandable resins (e.g., polystyrene, styrene grafted polypropylene, styrene grafted polyethylene, etc.) containing a blowing agent are prepared by suspension polymerization and then subjected to pre-expansion with steam. The pre-foamed synthetic resin particles attained by these methods may be spherical or cylindrical, or may assume any other shapes.

In the method of the present invention, a pressurized gas is used to increase the pressure in the mold cavity, to compress the pre-foamed synthetic resin particles and to charge them into the mold cavity. Air and inorganic gases such as nitrogen, etc., are preferably used as pressurized gases. Other gases may also be used and they include aliphatic hydrocarbon gases such as propane, butane, isobutane, pentane, etc., as well as halogenated hydrocarbon gases such as dichlorodifluoromethane, dichlorotetrafluoroethane, methyl chloride, etc. The inorganic gases mentioned above may be mixed with minor amounts of the gases listed above. Compressed air is typically used with advantage.

The compression ratio, or the degree by which pre-foamed synthetic resin particles are compressed with a pressurized gas, in the present invention may be expressed by the relationship between the inner capacity of the mold cavity and the volume in the atmosphere of pre-foamed synthetic resin particles to be charged into the mold cavity. The capacity of the mold cavity is equal to the cavity confining space of the mold. Although direct measurement of the capacity of the mold cavity is difficult to achieve, it may be regarded as being substantially equal to the volume of the foamed molded article formed in the space between a male mold and a female mold. Therefore, the compression ratio (%) of pre-foamed synthetic resin particles can be determined by the following equations:

$$\text{Compression ratio (\%)} = \frac{\left(\begin{array}{c}\text{Volume in the atmosphere}\\ \text{of pre-foamed synthetic}\\ \text{resin particles to be}\\ \text{charged into the mold}\\ \text{cavity}\end{array}\right) - \left(\begin{array}{c}\text{inner}\\ \text{capacity}\\ \text{of the}\\ \text{mold cavity}\end{array}\right)}{\left(\begin{array}{c}\text{Volume in the atmosphere of pre-}\\ \text{foamed synthetic resin particles}\\ \text{to be charged into the mold cavity}\end{array}\right)} \times 100$$

$$= \frac{\left(\begin{array}{c}\text{Volume in the atmosphere}\\ \text{of pre-foamed synthetic}\\ \text{resin particles to be}\\ \text{charged into the mold}\\ \text{cavity}\end{array}\right) - \left(\begin{array}{c}\text{Volume of the}\\ \text{foamed molded}\\ \text{article}\end{array}\right)}{\left(\begin{array}{c}\text{Volume in the atmosphere of pre-}\\ \text{foamed synthetic resin particles}\\ \text{to be charged into the mold cavity}\end{array}\right)} \times 100$$

$$= \frac{(W/\sigma - V)}{W/\sigma} \times 100$$

wherein W represents a weight of a foamed molded article, V represents a volume of foamed molded article and $\sigma$ represents a bulk density of pre-foamed synthetic resin particles.

In the practice of the method of the present invention, the compression ratio, as defined above, of pre-foamed synthetic resin particles is typically controlled to be within the range of 1 to 70%; for pre-foamed polypropylene particles and pre-foamed crosslinked polyethylene particles, which maintain atmospheric pressure (0 kg/cm$^2$G) in the interior of the cells, the compression ratio is preferably from 40 to 65%; for pre-foamed particles of styrene-based resins (containing less than 4% by weight of a volatile blowing agent) such as polystyrene, α-methylstyrene/styrene/acrylonitrile copolymer, and styrene/methyl methacrylate copolymer, the compression ratio is preferably from 3 to 25%; and the range of 3 to 40% is preferably used for pre-foamed particles of a styrene grafted polyethylene copolymer [e.g., Elempor (trade name) of Mitsubishi Yuka Badische Co., Ltd. and Piocelan (trade name) of Sekisui Plastics Co., Ltd.].

In the case where pre-foamed polypropylene particles and pre-foamed crosslinked polyethylene particles have been pressurized with a pressurized gas (e.g., air, nitrogen gas, etc.) and aged to increase the pressure in the cells to at least 0.5 kg/cm$^2$G, the compression ratio is controlled to be within the range of 10 to 20%.

Generally speaking, if the compression ratio of pre-foamed synthetic resin particles is unduly small, they will be fused insufficiently producing interstices at the interfaces among fused foamed synthetic resin particles and the appearance of the foamed molded article will be spoiled. If the compression ratio is unduly high, the pre-foamed synthetic resin particles will be excessively compressed to impede the flow of steam passing among individual pre-foamed synthetic resin particles and problems such as insufficient fusion of foamed synthetic resin particles, etc., will occur.

In the practice of the method of the present invention, it is recommended that the pressure in the mold cavity both before and during the charging of pre-foamed synthetic resin particles be maintained at between 0.1 and 6.0 kg/cm$^2$G by means of pressurizing with a pressurized gas. This is because the pre-foamed synthetic resin particles generally have bulk densities of 10 to 90 g/l and pressurization for a pressure within the above-stated range is optimal for the purpose of achieving 1 to 70% compression of such pre-foamed synthetic resin particles. If the pressure in the mold cavity is less than 0.1 kg/cm$^2$G, a compression ratio of 1% is difficult to attain, and if the mold cavity is pressurized to more than 6 kg/cm$^2$G, the compression ratio of pre-foamed synthetic resin particles may exceed 70%.

In the method of the present invention, pre-foamed synthetic resin particles are desirably charged into the mold cavity in successive portions under the pressure of a gas, as they are compressed by the same gas, which is pressurized to a pressure ($P_2$) of at least 0.5 kg/cm² higher than the above-stated pressure in the mold cavity for the purpose of facilitating the injection and movement of the pre-foamed synthetic resin particles in the mold cavity. If the pressurized gas has a pressure that is less than 0.5 kg/cm² higher than the pressure in the mold cavity, the pre-foamed synthetic resin particles will be injected into the mold cavity only insufficiently. The pre-foamed synthetic resin particles are charged into the mold cavity in successive portions in order that the mold cavity is completely charged with foamed synthetic resin particles even if it has an intricate shape.

After the mold cavity is charged with the pre-foamed synthetic resin particles, steam is injected into the mold cavity so as to remove any gas that remains in the gaps among individual pre-foamed synthetic resin particles. This is preferably done by injecting steam into the mold cavity as it retains the pressure in the mold cavity (0.5 to 6.0 kg/cm²) that has resulted from the charging of the mold cavity with the pre-foamed synthetic resin particles. Steam may be injected after the pressure is released from the mold cavity so as to restore the pre-foamed synthetic resin particles to their initial shape but, compared with this method, steam purging conducted with the pressure in the mold cavity being retained at 0.5 to 6.0 kg/cm² has the advantage that steam will easily pass through the large gaps among pre-foamed synthetic resin particles to permit the residual gas to be easily removed by a short purge period.

Particularly preferable methods of residual gas purge by steam injection are described below:

(1) With the pressure in the mold cavity being retained at a predetermined level, steam is injected into a steam chamber equipped with a movable die part and, after it passes through steam holes (core box vents) in the movable die part, the mold cavity and through steam holes in a fixed die part, the steam is ejected from the steam chamber equipped with the fixed die part;

(2) With the pressure in the mold cavity being retained at a predetermined level, steam is injected into the steam chamber equipped with a fixed die part and, after it passes through steam holes in the fixed die part, the mold cavity and through steam holes in the movable die part, the steam is ejected from the steam chamber equipped with the movable die part;

(3) Combinations of these two methods, the first method preceding the second method, or vice versa.

Following the residual gas purge by steam injection, the pressure in the mold cavity is released to become equal to the atmospheric pressure so that the compressed pre-foamed synthetic resin particles will restore to their initial shape. Subsequently, the two steam chambers equipped with both the movable die part and the fixed die part are simultaneously fed with steam, which typically has a pressure of 0.5 to 5 kg/cm², to heat the pre-foamed synthetic resin particles in the mold cavity so that they will be fused together or expanded and fused together to produce a foamed molded article, which is subsequently cooled and taken out of the mold.

A typical embodiment of the present invention is hereinafter described with reference to the case that employs the molding apparatus shown in FIG. 1 in partial elevational section. In FIG. 1, A denotes a rotary feeder that accomplishes the compression and charging of pre-foamed synthetic resin particles, B is a mold which is formed of a movable die part (male mold) and a fixed die part (female mold), and C is a conduit by which pre-foamed synthetic resin particles are conveyed from the rotary feeder A to the mold B.

The mold B has two steam chambers, 16 and 16'; steam chamber 16 has the space defined by a fixed die part 11, a frame 13, and back plate 14, and steam chamber 16' has the space defined by a movable die part 12, a frame 13' and a back plate 14'. A pressurized gas, say, compressed air, is injected into both chambers 16 and 16'; this gas has an air pressure $P_1$ (e.g., 0.1 to 6.0 Kg/cm²G) and pressurizes the two chambers so that they will have an internal pressure within the above-stated range.

As shown in FIG. 1, the rotary feeder A is chiefly composed of a casing 2 and a rotor 3 which is equipped with a plurality of chambers 4. The rotor 3 is so constructed that when one chamber 4 is rotated until one end thereof comes into registry with a pre-foamed synthetic resin particle inlet port 5 that is provided in the casing 2 to be connected to the feed throat of a hopper 1, the other end of the chamber 4 comes into agreement with a suction port 7 on a vacuum line 8. Because of this arrangement, the pre-foamed synthetic resin particles in the hopper 1 are sucked into the chamber 4 until they charge the latter. The chamber 4 charged with the pre-foamed synthetic resin particles then rotates with both ends sealed; when one end of the chamber 4 reaches a pre-foamed synthetic resin particle discharge port 6, the other end of the same chamber reaches a pressurized gas blow port 9 on a gas line 10 that is pressurized to a pressure $P_2$ which is higher, say at least 0.5 kg/cm² higher, than the above-stated pressure $P_1$. As a result, the pre-foamed synthetic resin particles in the chamber 4 being compressed by the pressurized gas ($P_2$) are conveyed through the conduit C and a blow-filling gun 15 to be charged into a mold cavity 21 that is formed of the fixed die part 11 and the movable die part 12 and the mold cavity 21 is pressurized to the above-stated pressure $P_1$. The pressure in the mold cavity 21 is held to be equal to the pressure in both steam chambers 16 and 16', the mold cavity 21 being made to communicate with the steam chambers 16 and 16' through steam holes 20 and 20'. Since the rotor 3 in the rotary feeder A is equipped with six chambers 4, the pre-foamed synthetic resin particles in the hopper 1 are charged into the mold cavity in successive portions by repeating the above-described procedures.

A pressure switch $P_s$ is provided in the conduit C by which pre-foamed synthetic resin particles are conveyed at a location near to the blow-filling gun 15. The pressure switch may be located at a different position, say $P_s'$ or $P_s''$, of the conduit. The pressure switch is preset such that it will be actuated when the pressure in the conduit C becomes higher than the pressure $P_1$ in the mold cavity by a certain amount, say 0.5 kg/cm². The pressure in the conduit C increased gradually as the pre-foamed synthetic resin particles in the hopper 1 are conveyed through the conduit C into the mold cavity 21 as a consequence of the turning of the rotor 3. When the pressure in the conduit C becomes higher than the pressure $P_1$ in the mold cavity by 0.5 kg/cm², the pressure switch $P_s$ is actuated to permit a plunger 22 to move in a direction that closes a charging port 23 leading to the mold cavity. At the same time, the pressure switch $P_s$ causes a motor for the rotary feeder A for the supply of pre-foamed synthetic resin particles to stop rotating so that the sppply of pre-foamed synthetic resin particles into the mold cavity is completely stopped. By setting the pressure in conduit C at an appropriate level above the pressure $P_1$ in accordance with the type of pre-foamed synthetic resin particles, the shape or size of the foamed molded article, etc., the supply of pre-foamed synthetic resin particles into the mold cavity can be stopped with the mold cavity being charged with just the necessary amount of pre-foamed synthetic resin particles.

After the mold cavity has been charged with pre-foamed synthetic resin particles, purge steam is injected through a steam pipe 17' into the steam chamber 16' equipped with the movable die part 12, with the pressure $P_1$ in the mold cavity being retained; the injected steam passes through steam holes 20' in the movable die part 12, the mold cavity 21, steam holes 20 in the fixed die part 11 and through the steam chamber 16 equipped with the fixed die part 11, then discharged out of the system through a vent pipe 18 equipped with a pressure regulating valve. As a result of this steam purging any gas (e.g., air, etc.) that is entrapped in the gaps among pre-foamed synthetic resin particles in the mold cavity 21 is carried by the steam to go outside the system. During steam purging, a vent pipe 18' and a drain discharge pipe 19' for the movable die part 12, as well as a steam pipe 17 and a drain discharge pipe 19 for the fixed die part 11 are closed by means of associated valves (not shown), while valves (not shown) on the steam pipe 17' for the movable die part and on the vent pipe 18 for the fixed die part are opened. Since the vent pipe 18 is equipped with a pressure regulating valve, the pressure in the mold cavity is maintained at a predetermined level throughout the period of steam purging.

Instead of being injected into the steam chamber 16', purge steam may be injected into the steam chamber 16 through the steam pipe 17 for the fixed die part 11 with the pressure in the mold cavity being retained at a predetermined level; in this case, the injected steam passes through the steam holes 20, the mold cavity 21, the steam holes 20' and through the steam chamber 16' to exit from the system through the vent pipe 18'.

The above-described two methods of steam purging may be carried out successively with the necessary valve switching being effected to shift from the first method to the second method, or vice versa.

Since steam must be injected into the steam chamber 16 or 16' in a consistent manner by overcoming the pressure $P_1$ in the mold cavity, the steam injected is required to have a pressure that is at least 0.2 kg/cm$^2$ higher than the pressure $P_1$.

After the residual gas has been purged from the system by steam injection, the steam pipes 17 and 17' are closed and thereafter the drain discharge pipes 19 and 19' are opened to reduce the pressure in the mold cavity 21 to the atmospheric pressure so that the compressed pre-foamed synthetic resin particles will be restored to their original shape. Then, steam heated to a predetermined temperature is supplied through the steam pipes 17 and 17' into the steam chambers 16 and 16' to heat the pre-foamed synthetic resin particles so that they will be fused together (when the compression ratio of the pre-foamed synthetic resin particles is from about 30% to about 70%) or expanded and fused together (when the compression ratio of the pre-foamed synthetic resin particles is up to about 30%) to form a foamed molded article. Subsequently, the fixed die part 11 and the movable die part 12 are cooled with water that is sprayed through cooling pipes provided in the steam chambers 16 and 16'. The die parts may be further cooled with a forced air-flow or by being left to stand in the ambient atmosphere before they are separated to recover the foamed molded article.

Figure 2:
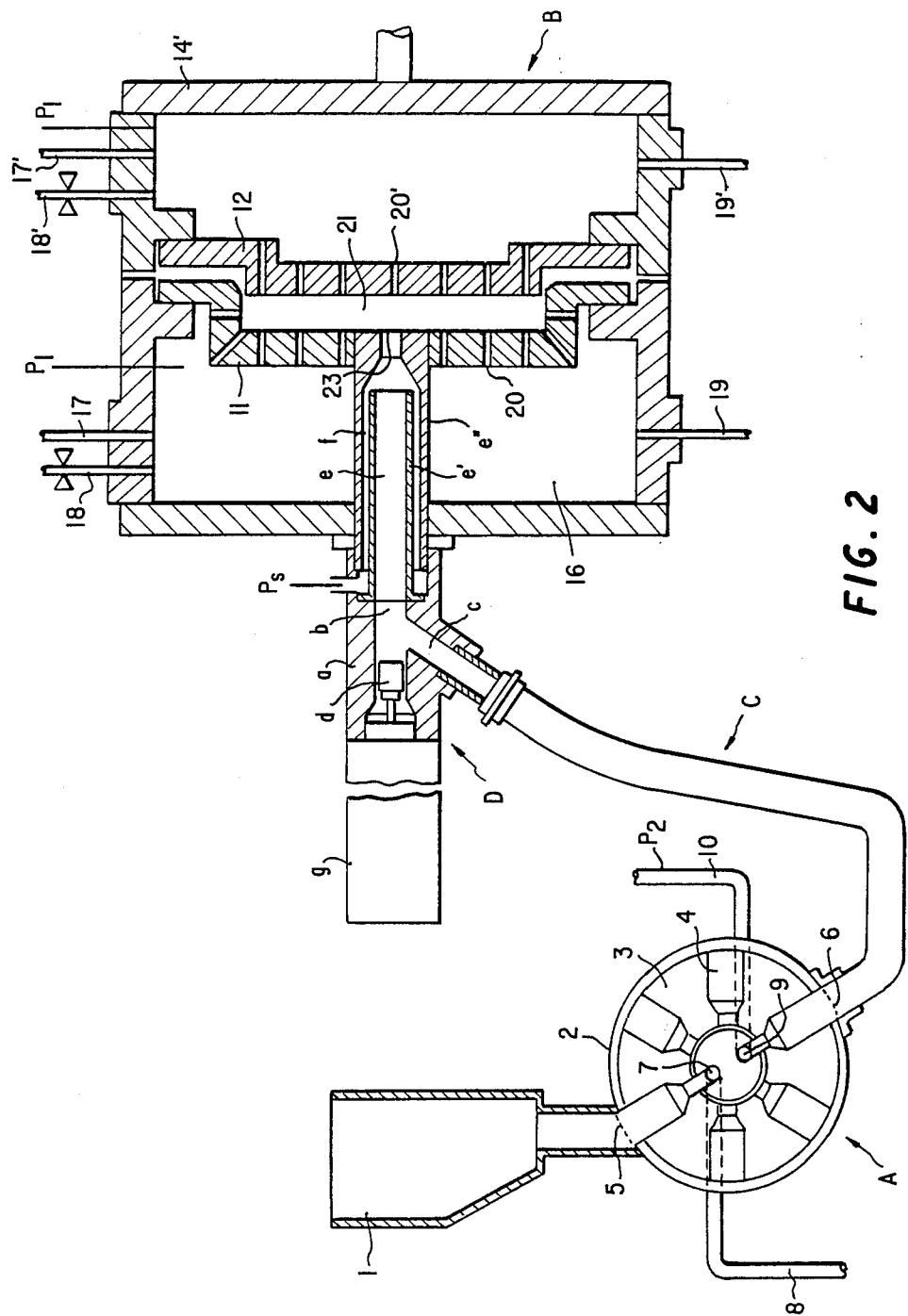
FIG. 2 show a molding appratus for molding pre-foamed synthetic resin particles wherein the inlet portion of the charging port for the particles to be fed to the mold cavity of the molding apparatus has a pressure switch.

Another typical embodiment of the present invention is hereinafter described with reference to the case that employs the molding apparatus shown in FIG. 2 in partial elevational section. In FIG. 2, A denotes a rotary feeder that accomplishes the compression and charging of pre-foamed synthetic resin particles, B is a mold which is formed of a movable die part (male mold) and a fixed die part (female mold), C is a conduit for conveying the pre-foamed synthetic resin particles, and D is a blow-filling gun apparatus for charging the pre-foamed synthetic resin particles.

The mold B has two steam chambers, 16 and 16'; steam chamber 16 has the space defined by a fixed die part 11, and frame 13, and back plate 14, and steam chamber 16' has the space defined by a movable die part 12, a frame 13' and a back plate 14'. A pressurized gas, say, compressed air, is injected into both chambers 16 and 16'; this gas has a pressure $P_1$ (e.g., 0.1 to 6.0 Kg/cm$^2$G) and pressurizes the two chambers so that they will have an internal pressure within the above-stated range.

As shown in FIG. 2, the rotary feeder A is chiefly composed of a casing 2 and a rotor 3 which is equipped with a plurality of chambers 4. The rotor 3 is so constructed that when one chamber 4 is rotated until one end thereof comes into registry with a pre-foamed synthetic resin particle inlet port 5 that is provided in the casing 2 to be connected to the feed throat of a hopper 1, the other end of the chamber 4 comes into agreement with a suction port 7 on a vacuum line 8. Because of this arrangement, the pre-foamed synthetic resin particles in the hopper 1 are sucked into the chamber 4 until they charge the latter. The chamber 4 charged with the pre-foamed synthetic resin particles then rotates with both ends are sealed; when one end of the chamber 4 reaches a pre-foamed synthetic resin particle discharge port 6, the other end of the same chamber reaches a pressurized gas blow port 9 on a gas line 10 that is pressurized to a pressure $P_2$ which is higher; say at least 0.5 kg/cm$^2$ higher, than the above-stated pressure $P_1$. As a result, the pre-foamed synthetic resin particles in the chamber 4 being compressed by the pressurized gas ($P_2$) are conveyed through the conduit C and the blow-filling gun apparatus D to be charged into a mold cavity 21 that is formed of the fixed die part 11 and the movable die part 12 and the mold cavity 21 is pressurized to the above-stated pressure $P_1$. The pressure in the mold cavity 21 is held to be equal to the pressure in both steam chambers 16 and 16', the mold cavity 21 being made to communicate with the steam chambers 16 and 16' through steam holes 20 and 20'. Since the rotor 3 in the rotary feeder A is equipped with six chambers 4, the pre-foamed synthetic resin particles in the hopper 1 are charged into the mold cavity in successive portions by repeating the above-described procedures.

The main body a of the blow-filling gun apparatus D has a main opening b that communicates with the charging port 23 leading to the mold cavity, and a branched opening c that communicates with conduit C by which pre-formed synthetic resin particles are conveyed. Communication between the main opening b and the charging port 23 leadinng to the mold cavity is established by a sheathed blow-filling gun cylinder e composed of an inner pipe e' and an outer pipe e". The inner pipe e' is spaced from the outer pipe e" by a gap f which communicates at its front end with the inlet portion of the charging port 23 and is provided with a pressure switch $P_s$ at its rear end. As will be obvious from the above-described structure, since the pressure in the gap f is always held to be substantially equal to the pressure at the inlet portion of the charging port 23, if the pressure switch $P_s$ is preset such that it will be actuated when the pressure in the gap f reaches a threshold level that is higher than the pressure $P_1$ in the mold cavity by, for example, 0.5 kg/cm², the pressure switch $P_s$ is actuated when the pressure at the inlet portion of the charging port 23 reaches the threshold level.

The pressure at the inlet portion of the charging port 23 increases gradually as the pre-foamed synthetic resin particles in the hopper are conveyed through the conduit C and the blow-filling gun apparatus D into the mold cavity 21 as a consequence of the turning of the rotor 3. When the pressure at that inlet portion becomes higher than the pressure $P_1$ in the mold cavity by, for example, 0.5 kg/cm², the pressure switch $P_s$ is actuated to actuate an air cylinder g which then permits a plunger d to advance in a direction that closes the charging port 23 leading to the mold cavity. At the same time, the pressure switch $P_s$ causes a motor for the rotary feeder A for the supply of pre-foamed synthetic resin particles to stop rotating so that the supply of pre-foamed synthetic resin particles into the mold cavity is completely stopped. By setting the pressure at the inlet portion of the charging port 23 at an appropriate level above the pressure P in the mold cavity in accordance with the type of pre-foamed synthetic resin particles, the shape or size of the foamed molded article, etc., the supply of pre-foamed synthetic resin particles into the mold cavity can be stopped with mold cavity being charged with just the necessary amount of pre-foamed synthetic resin particles.

After the mold cavity has been charged with pre-foamed synthetic resin particles, purge steam is injected through a steam pipe 17' into the steam chamber 16' equipped with the movable die part 12, with the pressure $P_1$ in the mold cavity being retained; the injected steam passes through steam holes 20' in the movable die part 12, the mold cavity 21, steam holes 20 in the fixed die part 11 and through the steam chamber 16 equipped with the fixed die part 11, then discharged out of the system through a vent pipe 18 equipped with a pressure regulating valve. As a result of this steam purging any gas (e.g., air, etc.) that is entrapped in the gaps among pre-foamed synthetic resin particles in the mold cavity 21 is carried by the steam to go outside the system. During steam purging, a vent pipe 18' and a drain discharge pipe 19' for the movable die part 12, as well as a steam pipe 17 and a drain discharge pipe 19 for the fixed die part 11 are closed by means of associated valves (not shown), while valves (not shown) on the steam pipe 17' for the movable die part and on the vent pipe 18 for the fixed die part are opened. Since the vent pipe 18 is equipped with a pressure regulating valve, the pressure in the mold cavity is maintained at a predetermined level throughout the period of steam purging.

Instead of being injected into the steam chamber 16', purge steam may be injected into the steam chamber 16 through the pipe 17 for the fixed die part 11 with the pressure in the mold cavity being retained at a predetermined level; in this case, the injected steam passes through the steam holes 20, the mold cavity 21, the steam holes 20' and through the steam chamber 16' to exit from the system through the vent pipe 18'.

The above-described two methods of steam purging may be carried out successively with the necessary valve switching being effected to shift from the first method to the second method, or vice versa.

Since steam must be injected into the steam chamber 16 or 16' in a consistent manner by overcoming the pressure $P_1$ in the molded cavity, the steam injected is required to have a pressure that is at least 0.2 kg/cm² higher than the pressure $P_1$.

After the residual gas has been purged from the system by steam injection, the steam pipes 17 and 17' are closed and thereafter the drain discharge pipes 19 and 19' are opened to reduce the pressure in the mold cavity 21 to the atmospheric pressure so that the compressed pre-foamed synthetic resin particles will be restored to their original shape. Then, steam heated to a predetermined temperature is supplied through the steam pipes 17 and 17' into the steam chambers 16 and 16' to heat the pre-foamed synthetic resin particles so that they will be fused together (when the compression ratio of the pre-foamed synthetic resin particles is from about 30% to about 70%) or expanded and fused together(when the compression ratio of the pre-foamed synthetic resin particles is up to about 30%) to form a foamed molded article. Subsequently, the fixed die part 11 and the movable die part 12 are cooled with water that is sprayed through cooling pipes provided in the steam chambers 16 and 16'. The die parts may be further cooled with a forced air-flow or by being left to stand in the ambient atmosphere before they are separated to recover the foamed molded article.

The following examples and comparative examples are provided for the purpose of further illustrating the present invention but are in no sense to be taken as limiting.

Preparation of pre-foamed synthetic resin particles

An autoclave (inner capacity, 3 liters) capable of withstanding a pressure of 50 kg/cm² was charged with 1,400 parts by weight of water (all parts mentioned hereinafter are on a weight basis), 600 parts of an ethylene/propylene random copolymer (Mitsubishi Norblene FG3, trade name of Mitsubishi Petrochemical Co., Ltd.; ethylene content, 3 wt%), 15 parts of calcium tertiary phosphate (suspending agent), 0.05 part of sodium dodecylbenzenesulfonate (surfactant), and 95 parts of butane (blowing agent). The charge was heated up to 135° C. from room temperature over a period of 1 hour under stirring at 430 rpm and held at 135° C. for 10 minutes, whereupon the pressure in the autoclave rose to 25 kg/cm²G. The discharge nozzle valve on the bottom of the autoclave was opened to liberate the contents of the autoclave to the atmosphere in a period of 2 seconds under stirring at 180 rpm. The resulting pre-foamed synthetic resin particles had a bulk density of 28 g/l and maintained atmospheric pressure (0 kg/cm²G) in the interior of the cells.

EXAMPLE 1

The pre-foamed particles of ethylene/propylene random copolymer having a bulk density of 28 g/l prepared by the method described above were molded into foamed molded articles with a molding apparatus of the type shown in FIG. 1. The molding machine, mold, rotary feeder that accomplished the compression and charging, and the blow-filling gun had the following specifications.

Molding machine:

DAIYA-600LF (trade name of Daisen Industry Co., Ltd.)

Mold:

Mold with an internal capacity of 4.5 liters that was capable of producing a foamed molded article measuring 300 mm in width, 300 mm in length and 50 mm in height.

Rotary feeder that accomplishes the compression and charging:

Equipped with 6 chambers each having an internal capacity of 50 ml and measuring 35 mm in diameter × 52 mm in length.

Blow-filling gun:

DAIYA-Feeder (trade name of Daisen Industry Co., Ltd.) with a bore diameter of 30 mm.

The molding method proceeded as follows. The mold was first closed and fed with compressed air to increase the pressure $P_1$ in the mold cavity up to 3.5 kg/cm$^2$G. Then, the pre-foamed synthetic resin particles having a bulk density of 28 g/l were supplied by means of the rotary feeder A in successive portions at intervals of 0.1 second with compressed air having a pressure ($P_2$) of 5.5 kg/cm$^2$G being used to charge the pre-foamed synthetic resin particles into the mold cavity. During the charging period, the pressure regulating valves mounted on vent pipes 18 and 18' were adjusted to maintain the pressure $P_1$ in the mold cavity at 3.5 kg/cm$_2$G.

The supply of pre-foamed synthetic resin particles into the mold cavity was stopped by means of a commercial pressure switch (DU type pressure gage, trade name of Daiichi Keiki Seisakusho K.K. and mounted in an area close to the blow-filling gun 15) in the following manner: the threshold pressure for actuation of the pressure switch was set at 4.0 kg/cm$^2$G and, when the pressure in the conduit for conveying the pre-foamed synthetic resin particles reached this threshold level, the plunger 22 in the blow-filling gun 15 immediately advanced in a direction that would close the charging port 23 leading to the mold cavity while, at the same time, the motor for the rotary feeder A was caused to stop rotating, whereupon the supply of the pre-foamed synthetic resin particles into the mold cavity was stopped.

After the supply of pre-foamed synthetic resin particles had been stopped, the steam pipe 17' was opened and steam (3.7 kg/cm$^2$G) was injected into the chamber 16' equipped with the movable die part for 5 seconds to perform steam purging while the pressure $P_1$ in the mold cavity was maintained at 3.5 kg/cm$^2$G by means of the pressure regulating valve on the vent pipe 18. Valve switching was then effected and steam (3.7 kg/cm$^2$G) was injected into the chamber 16 equipped with the fixed die part for 10 seconds and discharged from the system through the vent pipe 18' while the pressure $P_1$ in the mold cavity was maintained at 3.5 kg/cm$^2$G.

The steam pipes 17 and 17' were then closed to stop the supply of steam. Thereafter, the drain discharge pipes 19 and 19' were opened to momentarily reduce the pressure in the chambers 16 and 16' and the mold cavity 21 to the atmospheric pressure so that the pre-foamed synthetic resin particles would be restored to their original shape. The two steam chambers 16 and 16' equipped with the die parts were simultaneously fed with steam (4 kg/cm$^2$G) for 10 seconds, which heated the pre-foamed synthetic resin particles so that they would be fused together to produce a foamed molded article.

Finally, the mold was cooled with water for 50 seconds, then with a forced air flow for 8 seconds, followed b.y cooling in the ambient atmosphere for 60 seconds. The cooled mold was opened to recover the foamed molded article which was dried to a weight of 270 g (density, 60 g/l), indicating that the pre-foamed synthetic resin particles had been compressed by 53% during molding.

The mold cavity was completely charged with foamed synthetic resin particles by the force of restortion of the compressed pre-foamed synthetic resin particles, so that the obtained foamed molded article contained very few interstices among the foamed synthetic resin particles (only 2 interstices in a surface area of 25 cm$^2$), had all foamed synthetic resin particles fused together (the degree of fusion adhesive is 100%), and featured a very low reject rate (2%). The conditions employed in the molding of pre-foamed synthetic resin particles in Example 1 are summarized in Table 1, together with the reject rate of the foamed molded articles.

COMPARATIVE EXAMPLE 1

Pre-foamed synthetic resin particles were molded by repeating the procedures of Example 1 except that the charging of pre-foamed synthetic resin particles into the mold cavity was stopped when the count of the chambers (4) in the rotary feeder A reached 190 by measurement with a digital counter (OMRON H7CN, trade name of Tateishi Denki K.K.). The conditions employed in the molding of pre-foamed synthetic resin particles in Comparative Example 1 are summarized in Table 1, together with the reject rate of the foamed molded articles.

TABLE 1

| Molding Conditions | Example 1 | Comparative Example 1 |
|---|---|---|
| Average bulk density of pre-foamed synthetic resin particles (g/l) | 28 | 28 |
| Variation in the bulk density of pre-foamed synthetic resin particles (difference between maximum and minimum value) (g/l) | 8 | 8 |
| Threshold pressure setting for pressure switch (kg/cm$^2$G) | 4.0 | — |
| Count of chambers (4) in the rotary feeder | — | 190 |
| Pressure in the mold cavity, $P_1$ (kg/cm$^2$G) | 3.5 | 3.5 |
| Charging pressure, $P_2$ (kg/cm$^2$G) | 5.5 | 5.5 |
| Weight of foamed molded article with a volume of 4.5 liters (g) | 270 | 270 |
| Compression ratio of pre-foamed synthetic resin particles (%)* | 53 | 53 |
| Reject rate of foamed molded | 2 | 12 |

TABLE 1-continued

| Molding Conditions | Example 1 | Comparative Example 1 |
|---|---|---|
| articles (%) | | |

*As calculated by the equation identified earlier in this specification (so are the values of compression ratio shown in Table 2).

EXAMPLES 2 TO 4 AND COMPARATIVE EXAMPLES 2 TO 4

Three different types of pre-foamed synthetic resin particles that are shown in Table 2 and specified below were molded into foamed molded articles under the conditions identified in Table 2. The molding procedures were otherwise the same as those employed in Example 1 or Comparative Example 1. The results are also shown in Table 2.

Pre-foamed particles of crosslinked polyethylene:

Particle size, 10 mm; degree of crosslinking, 55% (gel fraction); bulk density, 15.6 g/l; interior pressure of cells, atmosphere (0 kg/cm$^2$G)

Pre-foamed particles of styrene-modified polyethylene:

Pre-expanded particles with a size of 5 mm, a bulk density of 31.8 g/l, and a styrene-to-polyethylene weight ratio of 1:1

Pre-foamed particles of polystyrene:

Pre-expanded particles with a size of 3 mm and a bulk density of 20 g/l mold, rotary feeder that accomplished the compression and charging, and the blow-filling gun had the following specifications.

Molding machine:

DAIYA-600LF (trade name of Daisen Industry Co., Ltd.)

Mold:

Mold with an internal capacity of 4.5 liters that was capable of producing a foamed molded article measuring 300 mm in width, 300 mm in length and 50 mm in height.

Rotary feeder that accomplishes the compression and charging:

Equipped with 6 chambers each having an internal capacity of 50 ml and measuring 35 mm in diameter × 52 mm in length.

Blow-filling gun:

DAIYA-Feeder (trade name of Daisen Industry Co., Ltd.) with a bore diameter of 30 mm.

The molding method proceeded as follows. The mold was first closed and fed with compressed air to increase the pressure $P_1$ in the mold cavity up to 3.5 kg/cm$^2$G. Then, the pre-foamed synthetic resin particles having a bulk density of 28 g/l were supplied by means of the rotary feeder A in successive portions at intervals of 0.1 second with compressed air having a pressure ($P_2$) of 5.5 kg/cm$^2$G being used to charge the pre-foamed synthetic resin particles into the mold cavity. During the

TABLE 2

| | Example 2 | Comparative Example 2 | Example 3 | Comparative Example 3 | Example 4 | Comparative Example 4 |
|---|---|---|---|---|---|---|
| Molding Conditions | | | | | | |
| Type of pre-foamed synthetic resin particles | Pre-foamed crosslinked polyethylene particles | pre-foamed crosslinked polyethylene particles | pre-foamed styrene-modified polyethylene particles | pre-foamed styrene-modified polyethylene particles | pre-foamed polyethylene particles | pre-foamed polystyrene particles |
| Average bulk density of pre-foamed synthetic resin particles (g/l) | 16 | 16 | 32 | 32 | 20 | 20 |
| Variation in the bulk density of pre-foamed synthetic resin particles (Max-Min) (g/l) | 3 | 3 | 6 | 6 | 2 | 2 |
| Threshold pressure setting for pressure switch, $P_S$ (kg/cm$^2$G) | 1.0 | — | 1.0 | — | 0.8 | — |
| Count of chambers (4) in the rotary feeder | — | 160 | — | 105 | — | 110 |
| Pressure in the mold cavity, $P_1$ (kg/cm$^2$G) | 0.5 | 0.5 | 0.4 | 0.4 | 0.3 | 0.3 |
| Charging pressure, $P_2$ (kg/cm$^2$G) | 3.0 | 3.0 | 2.5 | 2.5 | 2.0 | 2.0 |
| Weight of foamed molded article with a volume of 4.5 liters (g) | 130 | 130 | 170 | 170 | 110 | 110 |
| Compression ratio of pre-foamed synthetic resin particles (%)* | 45 | 45 | 15 | 15 | 18 | 18 |
| Reject rate of foamed molded articles (%) | 0 | 5 | 0 | 6 | 1 | 8 |

EXAMPLE 5

The pre-foamed particles of ethylene/propylene random copolymer having a bulk density of 28 g/l prepared by the already described method were molded into foamed molded articles with a molding apparatus of the type shown in FIG. 2. The molding machine, charging period, the pressure regulating valves mounted on vent pipes 18 and 18' were adjusted to maintain the pressure $P_1$ in the mold cavity at 3.5 kg/cm$^2$G.

The supply of pre-foamed synthetic resin particles into the mold cavity was stopped by means of a commercial pressure switch (DU type pressure gage, trade name of Daiichi Keiki Seisakusho K.K. and mounted in gap f in the blow-filling gun apparatus D) in the following manner: the threshold pressure for actuation of the pressure switch was set at 4.0 kg/cm$^2$G and, when the pressure at the inlet portion of the charging port leading to the mold cavity reached this threshold level, the air cylinder g in the blow-filling gun was immediately actuated so as to advance the plunger d in a direction that would close the charging port 23 while, at the same time, the motor for the rotary feeder A was caused to stop rotating, whereupon the supply of the pre-foamed synthetic resin particles into the mold was stopped.

After the supply of pre-foamed synthetic resin particles had been stopped, the steam pipe 17' was opened and steam (3.7 kg/cm$^2$G) was injected into the chamber 16' equipped with the movable die part for 5 seconds to perform steam purging while the pressure $P_1$ in the mold cavity was maintained at 3.5 kg/cm$^2$G may means of the pressure regulating valve on the vent pipe 18. Valve switching was then effect and steam (3.7 kg/cm$^2$G) was injected into the chamber 16 equipped with the fixed die part for 10 seconds and discharged from the system through the vent pipe 18' while the pressure $P_1$ in the mold cavity was maintained at 3.5 kg/cm$^2$G.

The steam pipes 17 and 17' were then closed to stop of steam. Thereafter, the drain discharge pipes 19 and 19' were opened to momentarily reduce the pressure in the chambers 16 and 16' and the mold cavity 21 to the atmospheric pressure so that the pre-foamed synthetic resin particles would be restored to their original shape. The two steam chambers 16 and 16' equipped with the die parts were simultaneously fed with steam (4 kg/cm$^2$G) for 10 seconds, which heated the pre-foamed synthetic resin particles so that they would be fused together to produce a foamed molded article.

Finally, the mold was cooled with water for 50 seconds, then with a forced air flow for 8 seconds, followed by cooling in the ambient atmosphere for 60 seconds. The cooled mold was opened to recover the foamed molded article which was dried to a weight of 270 g (density, 60 g/l), indicating that the pre-foamed synthetic resin particles had been compressed by 53% during molding.

The mold cavity was completely charged with foamed synthetic resin particles by the force of restortion of the compressed pre-foamed synthetic resin particles, so that the obtained foamed molded article contained very few interstices among the foamed synthetic resin particles (only 2 interstices in a surface area of 25 cm$^2$), had all foamed synthetic resin particles fused together (the degree of fusion adhesive is 100%), and featured a very low reject rate (2%). The conditions employed in the molding of pre-foamed synthetic resin particles in Example 5 are summarized in Table 3, together with the reject rate of the foamed molded articles.

COMPARATIVE EXAMPLE 5

Pre-foamed synthetic resin particles were molded by repeating the procedures of Example 5 except that the charging of pre-foamed synthetic resin particles into the mold cavity was stopped when the count of the chambers (4) in the rotary feeder A reached 190 by measurement with a digital counter (OMRON H7CN, trade name of Tateishi Denki K.K.). The conditions employed in the molding of pre-foamed synthetic resin particles in Comparative Example 5 are summarized in Table 3, together with the reject rate of the foamed molded articles.

TABLE 3

| Molding Conditions | Example 5 | Comparative Example 5 |
|---|---|---|
| Average bulk density of pre-foamed synthetic resin particles (g/l) | 28 | 28 |
| Variation in the bulk density of pre-foamed synthetic resin particles (difference between maximum and minimum value) (g/l) | 8 | 8 |
| Threshold pressure setting for pressure switch (kg/cm$^2$G) | 4.0 | — |
| Count of chambers (4) in the rotary feeder | — | 190 |
| Pressure in the mold cavity, $P_1$ (kg/cm$^2$G) | 3.5 | 3.5 |
| Charging pressure, $P_2$ (kg/cm$^2$G) | 5.5 | 5.5 |
| Weight of foamed molded article with a volume of 4.5 liters (g) | 270 | 270 |
| Compression ratio of pre-foamed synthetic resin particles (%)* | 53 | 53 |
| Reject rate of foamed molded articles (%) | 1 | 12 |

*As calculated by the equation identified earlier in this specification (so are the values of compression ratio shown in Table 4).

EXAMPLES 6 TO 8 AND COMPARATIVE EXAMPLES 6 TO 8

Three different types of pre-foamed synthetic resin particles that are shown in Table 4 and specified below were molded into foamed molded articles under the conditions identified in Table 4. The molding procedures were otherwise the same as those employed in Example 5 or Comparative Example 5. The results are also shown in Table 4.

Pre-foamed particles of crosslinked polyethylene:
Particle size, 10 mm; degree of crosslinking, 55% (gel fraction); bulk density, 15.6 g/l; interior pressure of cells, atmosphere (0 kg/cm$^2$G)

Pre-foamed particles of styrene-modified polyethylene:
Pre-expanded particles with a size of 5 mm, a bulk density of 31.8 g/l, and a styrene-to-polyethylene weight ratio of 1:1

Pre-foamed particles of polystyrene:
Pre-expanded particles with a size of 3 mm and a bulk density of 20 g/l

TABLE 4

| | Example 6 | Comparative Example 6 | Example 7 | Comparative Example 7 | Example 8 | Comparative Example 8 |
|---|---|---|---|---|---|---|
| Molding Conditions | | | | | | |
| Type of pre-foamed synthetic resin particles | Pre-foamed crosslinked polyethylene particles | pre-foamed crosslinked polyethylene particles | pre-foamed styrene-modified polyethylene particles | pre-foamed styrene-modified polyethylene particles | pre-foamed polystyrene particles | pre-foamed polystyrene particles |

TABLE 4-continued

|  | Example 6 | Comparative Example 6 | Example 7 | Comparative Example 7 | Example 8 | Comparative Example 8 |
| --- | --- | --- | --- | --- | --- | --- |
| Average bulk density of pre-foamed synthetic resin particles (g/l) | 16 | 16 | 32 | 32 | 20 | 20 |
| Variation in the bulk density of pre-foamed synthetic resin particles (Max-Min) (g/l) | 3 | 3 | 6 | 6 | 2 | 2 |
| Threshold pressure setting for pressure switch, $P_S$ (kg/cm$^2$G) | 1.0 | — | 1.0 | — | 0.8 | — |
| Count of chambers (4) in the rotary feeder | — | 160 | — | 105 | — | 110 |
| Pressure in the mold cavity, $P_1$ (kg/cm$^2$G) | 0.5 | 0.5 | 0.4 | 0.4 | 0.3 | 0.3 |
| Charging pressure, $P_2$ (kg/cm$^2$G) | 3.0 | 3.0 | 2.5 | 2.5 | 2.0 | 2.0 |
| Weight of foamed molded article with a volume of 4.5 liters (g) | 130 | 130 | 170 | 170 | 110 | 110 |
| Compression ratio of pre-foamed synthetic resin particles (%)* | 45 | 45 | 15 | 15 | 18 | 18 |
| Reject rate of foamed molded articles (%) | 0 | 5 | 1 | 6 | 1 | 8 |

As will be understood from the foregoing description, the present invention provides for easy molding of prefoamed synthetic resin particles into foamed molded articles having a uniform density distribution and superior appearance with the reject rate of foamed molded articles being held to a minimum level.

While the invention has been described in detail and with reference to specific embodiments thereof, it will be apparent to one skilled in the art that various changes and modifications can be made therein without departing from the spirit and scope thereof.

What is claimed is:

1. A method of molding pre-foamed synthetic resin particles into a foamed molded article, which comprises the steps of:
   increasing the pressure in a mold cavity having a charging port with a pressurized gas;
   charging said mold cavity with pre-foamed synthetic resin particles as they are compressed with a gas pressurized to a pressure higher than the pressure in the mold cavity through a conduit into the mold cavity;
   controlling said charging such that the supply of pre-foamed resin particles is stopped when the pressure within said conduit or said charging port, as detected by a pressure sensitive switch, exceeds the pressure in the mold cavity by a predetermined amount; and
   heating the charged pre-foamed synthetic resin particles with steam so that they are fused together or expanded and fused together to form a foamed molded article.

2. The method according to claim 1, wherein said pressure sensitive switch is provided in the conduit which conveys the pre-foamed synthetic resin particles into the mold cavity as the particles are carried by said pressurized gas.

3. The method according to claim 2, wherein the supply of pre-foamed synthetic resin particles into the mold cavity is stopped when the pressure detected by said detector exceeds the pressure in the mold cavity by 0.2 to 1 kg/cm$^2$.

4. The method according to claim 2 or 3, wherein the pre-foamed synthetic resin particles are supplied into the mold cavity at intervals in successive portions.

5. The method according to claim 1, wherein said pressure detector is provided at the inlet portion of a charging port leading to the mold cavity.

6. The method according to claim 5, wherein the supply of pre-foamed synthetic resin particles into the mold cavity is stopped when the pressure detected by said detector exceeds the pressure in the mold cavity by 0.2 to 1 kg/cm$^2$.

7. The method according to claim 5 or 6, wherein the pre-foamed synthetic resin particles are supplied into the mold cavity at intervals in successive portions.

8. The method according to claim 1, wherein said pressure in the mold cavity is at least 0.1 to 6.0 kg/cm$^2$G.

9. The method according to claim 1, wherein said pre-foamed synthetic resin particles are selected from the group consisting of pre-foam polypropylene particles and pre-foamed crosslinked polyethylene particles, which maintain atmospheric pressure (0 kg/cm$^2$G) in the interior of the cells.

10. The method according to claim 1, wherein said pre-foamed synthetic resin particles are selected from the group consisting of pre-foamed polypropylene particles and pre-foamed crosslinked polyethylene particles which have been pressurized with a pressurized gas and aged to increase the pressure in the cells to at least 0.5 kg/cm$^2$G.

11. The method according to claim 9, wherein said pre-foamed synthetic resin particles have a compression ratio of from 40 to 65%.

12. the method according to claim 10, wherein said pre-foamed synthetic resin particles have a compression ratio ranging from 10 to 20%.

13. A blow-filling gun apparatus for charging pre-foamed synthetic resin particles into a mold cavity, which comprises:
- a main opening that communicates with a charging port leading to said mold cavity;
- a branched opening that communicates with a conduit for conveying said pre-foamed synthetic resin particles to said mold cavity;
- a sheathed blow-filling gun cylinder comprised of an inner pipe concentrically disposed within an outer pipe and spaced apart from said outer pipe, said cylinder connecting said charging port leading to the mold cavity to said main opening; and
- a plunger that is capable of closing and charging port leading to the mold cavity, said space between said inner and outer pipes of said sheathed blow-filling gun cylinder communicating with the inlet portion of said charging port leading to the mold cavity, and a pressure sensitive switch being mounted in the space between the inner and outer pipes of said sheathed blow-filling filling gun cylinder.

* * * * *